July 11, 1967  J. P. F. OSTERWALDER  3,330,975
SELF-STARTING SYNCHRONOUS MOTOR
Filed Oct. 15, 1964   5 Sheets-Sheet 1

INVENTOR.
JEAN PIERRE OSTERWALDER
BY
Irons, Birch, Swindler & McKie
ATTORNEYS

INVENTOR.
JEAN PIERRE OSTERWALDER

INVENTOR
JEAN PIERRE OSTERWALDER

July 11, 1967  J. P. F. OSTERWALDER  3,330,975
SELF-STARTING SYNCHRONOUS MOTOR
Filed Oct. 15, 1964  5 Sheets-Sheet 5

INVENTOR
JEAN PIERRE OSTERWALDER
BY *Irons, Birch, Swindler & McKie*
ATTORNEYS

United States Patent Office 3,330,975
Patented July 11, 1967

3,330,975
SELF-STARTING SYNCHRONOUS MOTOR
Jean Pierre F. Osterwalder, Vienna, Va., assignor to Vega Precision Laboratories, Inc., Vienna, Va., a corporation of Virginia
Filed Oct. 15, 1964, Ser. No. 404,108
33 Claims. (Cl. 310—164)

This invention relates to synchronous motors, and more particularly to high efficiency, self-starting synchronous motors.

While electric motors of other than synchronous characteristics have been developed to the point of operation at quite high efficiencies, the usual commercially-available synchronous motor is of comparatively low efficiency. This is particularly true in the case of self-starting synchronous motors, especially because of the manner in which the self-starting characteristic is normally obtained.

In the shaded pole self-starting arrangement, the stator is provided with metallic rings which form short-circuited turns. The current caused to flow in these shading rings by flux changes in the stator develops a secondary flux which is phase-shifted with respect to the primary flux. The phase-displaced nature of the two fluxes provides for the self-starting principle.

Obviously, a great deal of non-productive work is required to achieve the self-starting characteristics of the shaded pole motor so that the efficiency is necessarily very low.

It is a prime object of this invention to obtain self-starting characteristics in a synchronous motor, yet with very high efficiency.

It has been suggested, particularly in Guiot Patent No. 3,119,941 that self-starting characteristics be obtained in a pulse motor through the use of triangularly-shaped stator pole piece teeth, these teeth being part of an annular magnetic path which surrounds the stator winding, and being inclined in opposite directions but lying in the same cylindrical path. The rotor of the Guiot motor carries a permanent magnet formed with a number of discrete poles which are alternately magnetized in opposite radial directions. This rotor is coaxial with the stator and rotates inwardly thereof.

While it may be possible that the Guiot construction can provide for self-starting, it will be immediately evident that the shortest path for the stator magnetic flux is through the air gaps between the opposite triangular teeth of the pole pieces. Thus, only the fringe stator flux passes through the rotor. The result is that a rather low efficiency is obtained with the Guiot structure.

It is a prime object of the present invention to obtain a much higher efficiency than has been obtained in the past with synchronous motor structures, yet to provide self-starting characteristics.

Another prime problem with prior art synchronous motors of the self-starting type is their frequency dependence. In other words, the phase delay scheme of self-starting necessarily requires that the motor operate only at one frequency or in one very narrow band of frequencies. It is a prime object of the present invention to provide for self-starting synchronous operation at any frequency, without change in the mechanical structure of the motor. In other words, the motor of the present invention is designed to operate at the frequency of its power source, no matter what that frequency.

The apparatus of the invention, generally speaking, comprises a synchronous motor having magnetic pole pieces or shoes which terminate in opposite teeth which extend parallel to each other to define an annular air gap. One or more field windings link said pole pieces in such manner that current flowing through the windings causes flux to flow in said teeth through said air gap. Mounted to rotate between (not merely adjacent) the opposed parallel teeth of the stator winding is a permanent magnet rotor having a plurality of poles spaced apart around its periphery, with adjacent poles of opposite polarity. At least in the single-phase execution of the invention, the stator teeth are preferably of generally right-triangular shape with the perpendicularly-disposed legs of opposite teeth being respectively coplanar.

As the last statement indicates, the invention contemplates a plural phase stator and, in this execution, a plurality of arcuately-spaced field coils, each with its own separate magnetic circuit is employed. The rotor, however, passes between the opposed stator teeth of each unit circuit.

With each of these structures, as will be more apparent hereafter, a very high efficiency is obtained because the rotor poles are located in the shortest path between the stator teeth, yet self-starting characteristics and frequency independence are also obtained.

The invention will now be more fully described in conjunction with drawings showing preferred embodiments thereof.

In the drawings:

FIG. 4 is a partial sectional view taken along line 4—4 of FIG. 1 but with the casing of the motor removed;

FIGS. 5–8 are partial elevational views taken along line 5—5 of FIG. 4 showing the relative magnetic and physical progression of the rotor poles and the stator teeth;

FIGS. 5a–8a are partial sectional views taken along lines 5a—5a to 8a—8a, respectively, of FIGS. 5 to 8;

FIGS. 5b–8b are diagrammatic showings of the changing amplitude and phase of the stator flux in the successive conditions represented by FIGS. 5–8;

Referring first to the embodiment shown in FIGS. 1–8, the motor includes a rotor generally shown at 10 and a stator generally indicated at 11. The rotor is itself composed of two separate sections or parts 12 and 13, each section having a central supporting disc portion 14 and 15, respectively, and a plurality of axially-extending arcuately displaced teeth 16 and 17. The separate sections or discs of the rotor are of course of hard magnetic material and are magnetized prior to assembly into the motor. The sections are oppositely radially magnetized, such that the teeth of the section 12 are north poles on the outer sides and south poles on the inner sides, while the teeth of section 13 are south poles on the outer sides and north poles on the inner sides. Of course it will be evident that the polarity could be reversed from that shown in the drawings.

Figures 1, 2, 3, 9:
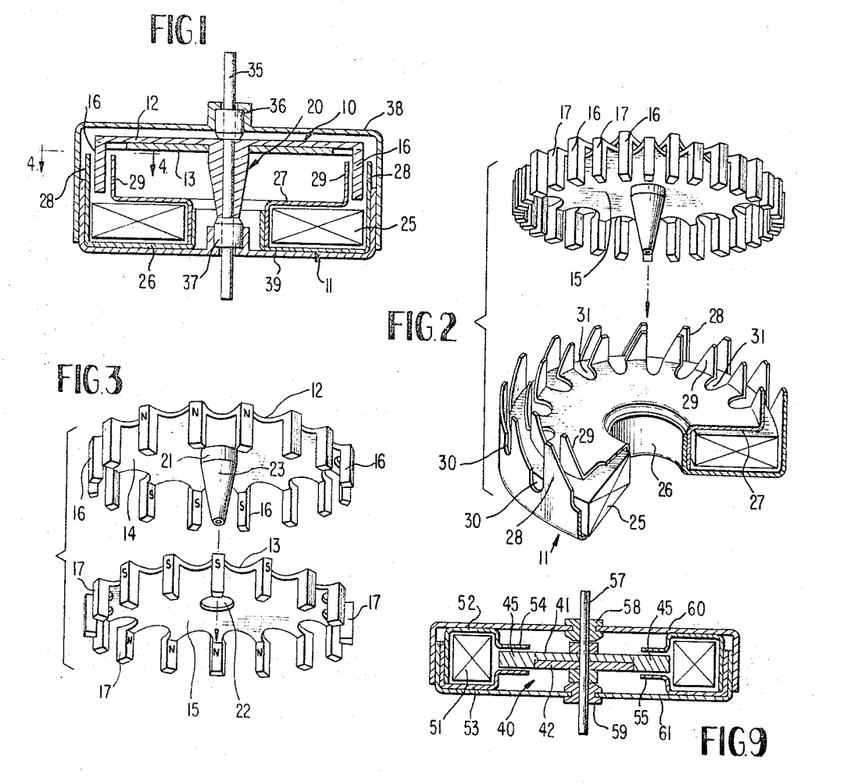
FIG. 1 is a cross sectional view of one embodiment of a synchronous motor in accordance with the invention.
FIG. 2 is an exploded perspective view of the structure of the embodiment of FIG. 1, with the casing removed and showing the stator and rotor separated from each other.
FIG. 3 is an exploded perspective view of the rotor of FIG. 1, showing the separate structure of the opposite polarity poles of the rotor.
FIG. 9 is a cross sectional view similar to FIG. 1, showing a second embodiment of the invention.

The rotor section 12 is provided with an arbor 20 having a neck 21 of size such as to fit within a circular passage 22 in the section 13 and with a gradually diminishing portion 23 which is of frustro-conical cross section.

When the rotor is assembled, the arbor 20 fits within the passage 22 such that the teeth 17 of the part 13 nest between the teeth 16 of the section 12. As a result, the adjacent rotor teeth are of opposite polarity to each other.

The stator 11 includes an annular field coil or winding 25 which is provided with two pole shoes or pole pieces 26 and 27. These pole shoes are of soft iron characteristics such as to furnish a low reluctance path for magnetic flux, and they substantially envelop the stator winding 25. However, each pole piece 26 and 27 has a set of arcuately displaced teeth 28 and 29 which extend away from the field winding 25 and are parallel to each other. The pole shoe teeth define an annular air gap into which the rotor teeth 16 and 17 extend.

It will be seen from FIGS. 2 and 3 especially, that the stator teeth 28 and 29 are generally of right triangular shape (actually trapezoidal) with the inclined or hypotenuse section of each tooth 28 opposite the similarly inclined portion of the corresponding tooth 29. The hypotenuse of each tooth 28 and 29 extends from an apex which is most remote from the field winding to the main body of the pole piece, and the hypotenuse of each tooth is parallel to the hypotenuse of every other tooth. Adjacent teeth of the same pole shoes are respectively separated by cutout portions 30 and 31, respectively.

As indicated, the teeth 28 and 29 are actually of trapezodial shape, since the apex portion of the triangle generally defined by each tooth is removed. This feature is not critical to operation of the apparatus but rather is for simplicity of manufacture.

It will also be noted that each tooth has a rectangular portion between the triangular portion and the main body of the pole piece. However, the rectangular portion is not opposite the rotor poles, but rather is axially displaced therefrom.

The rotor of the embodiment of FIGS. 1–8 is provided with a central shaft or axle 35 which extends through a passage in the arbor 20 and is provided with bearings 36 and 37 at opposite ends thereof. These bearings fit within the correspondingly-shaped portions of a motor housing formed by metallic sheets 38 and 39.

Referring now to FIGS. 4–8 for an explanation of the operation of the embodiment of FIGS. 1–4, that explanation will be expedited by consideration of two adjacent stator teeth labelled 28a and 28b, the opposite rotor teeth being 16a and 26b. As is evident from the drawings, the number of rotor teeth is twice the number of stator teeth, so that fitting between the rotor teeth 16a and 16b and between the stator teeth 28a and 28b is an opposite polarity rotor tooth 17a. (This particular relationship is not critical to the invention but occurs whenever the total number of stator teeth is equal to the number of rotor poles. There must be a number of stator teeth and rotor poles such that with two rotor poles opposite adjacent stator teeth of one polarity, there will be an odd number of rotor poles therebetween.)

Figures 4, 5, 5A, 5B:
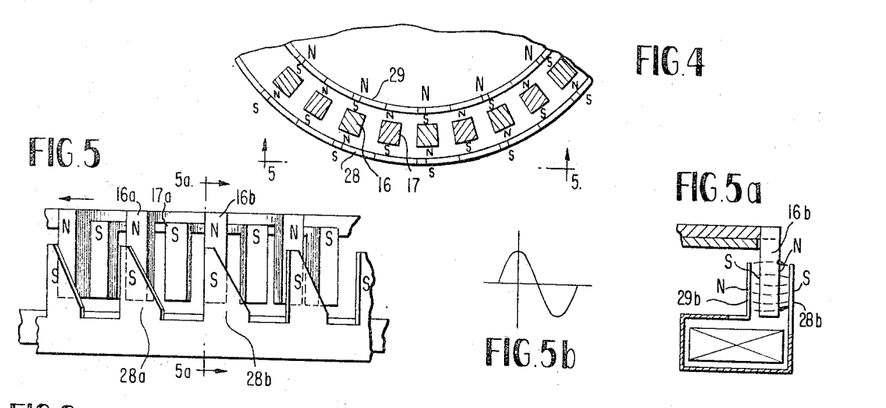

It will be seen from FIGS. 5–5b that, with the flux maximum in one direction, the pole piece teeth 28 are all south poles and the teeth 29 are all north poles. The rotor has been forced to a position by mechanism now to be described, such that the outwardly north rotor poles 16 are opposite the south pole piece teeth 28 (the inwardly south rotor poles 16 are of course opposite the north piece teeth 29) and the oppositely polarized rotor poles 17 are positioned between adjacent stator teeth of one polarity.

Figure 6:
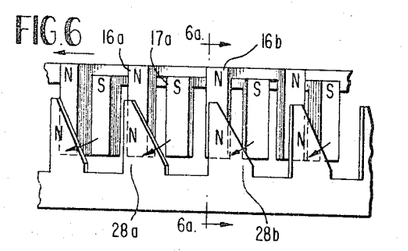
Figure 6A:
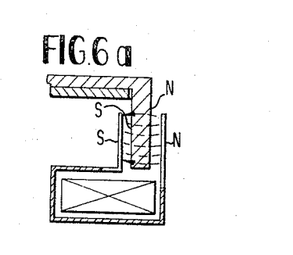
Figure 6B:
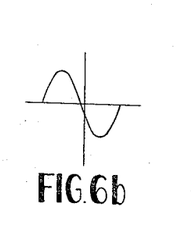

Progressing from FIG. 5 to FIG. 6, as indicated in FIG. 6b the current supplied to the stator field winding 25 has reversed in polarity, so that the stator teeth 28a and 28b (as in the case of all other stator teeth 28) are north poles with respect to the stator teeth 29. Now the rotor teeth 16a and 16b are opposite stator teeth of the same polarity so that there is repulsion therebetween. Further, the rotor tooth 17a is between the opposite polarity stator teeth 28a and 28b, so that there is attraction therebetween.

The magnitude of the force of attraction between opposite polarity stator and rotor teeth of course is determined both by the amplitude of the surface areas which are opposite each other, and by the distance therebetween. However, this attraction is merely proportional to the first power of the area but is proportional to the inverse square of the distance. As an illustration of application of this proportionality to the apparatus of the invention, the force of attraction between the lowermost portion of rotor pole 17a and the opposite portion of stator tooth 28a is very much more than the force attracting that same portion of the rotor pole toward stator tooth 28b. In fact, the excess is so much as to overcome the opposite attracting force on the upper portion of the rotor pole (opposite because the distance relationship reverses for such upper portion). Consequently, with the triangular stator teeth configuration of the apparatus of the invention, the rotor tooth 17a is attracted toward the stator tooth 28a rather than the tooth 28b, as indicated by the arrow in FIG. 6. Corresponding arrows indicate attraction between other ones of the rotor teeth 17 and the opposite stator teeth 28. Of course similar attractive and repulsive forces will exist between the rotor teeth and the inner stator teeth 29.

Figure 7:
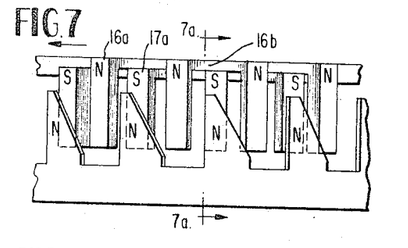
Figure 7A:
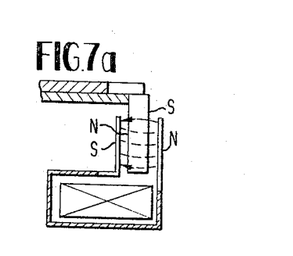
Figure 7B:
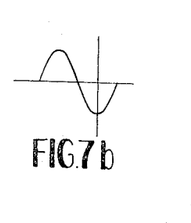

As a result, the rotor advances in a generally clockwise direction (or to the left of FIG. 6) to the position shown in FIG. 7, when the field flux (and hence the attractive force) is maximum.

Figure 8:
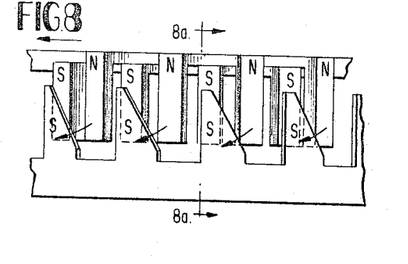
Figure 8A:
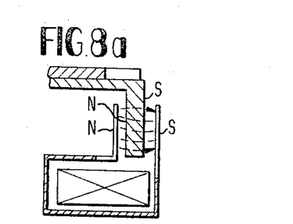
Figure 8B:
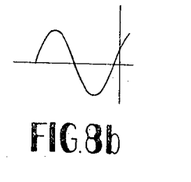

When the phase of the current supplied to the stator coil or winding changes again, the rotor starts again to advance, as is indicated by the arrows shown in FIG. 8, the advance of course being in the same direction as described above in conjunction with FIGS. 6 and 7.

As is evident from the description hereinabove, a single phase alternating current source will supply a field current appropriate to drive the synchronous motor at a speed proportional to the frequency of the source. The actual speed of revolution will of course be dependent upon the number of poles of the motor, as well as upon the frequency of the source. Since there is no phase sensitive self-starting feature in the apparatus of the invention, however, there is not only no wastage of electric power, but there also is no dependence upon mechanical design for the speed of operation. Consequently, the speed of rotation of the motor may readily by varied over extremely wide ranges from near zero frequency to extremely high speeds, by mere variation in the frequency of the power supply.

This frequency-independence feature is of great importance and of extreme significance when a motor-driven apparatus must be run at different speeds at different times. Such an apparatus is a magnetic recording and reproduction system for measurement transducers in space craft, wherein recording is usually at a much lower speed than reproduction. With the apparatus of the invention one high efficiency motor can do both jobs by mere change in the supply frequency.

Figure 10:
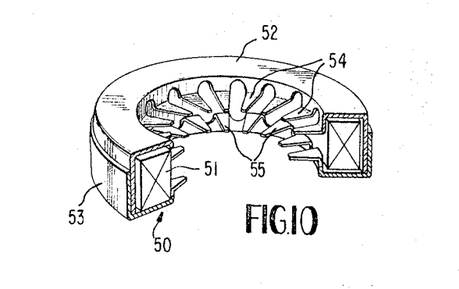
FIG. 10 is a partial perspective view of the stator of the embodiment of FIG. 9.
Figure 11:
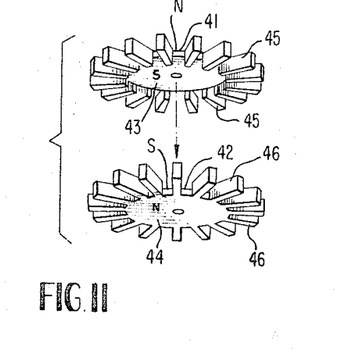
FIG. 11 is an exploded perspective view of the two segments of the rotor of the embodiment of FIG. 9.

Referring now to the second embodiment of the invention shown in FIGS. 9–11, the rotor generally indicated at 40 is formed of two discs 41 and 42. Each disc is provided with a central supporting portion 43 and 44, respectively, from which extend arcuately-displaced teeth 45 and 46, respectively. Rather than extending axially, however, the rotor teeth 45 and 46 extend radially. The disc or rotor section 41 is magnetized oppositely to the disc 42, in an axial direction, so that as shown in FIGS. 9 and 11, the lowermost portions of the rotor teeth 45 are south poles and the uppermost portions are north poles, while the lowermost portions of the rotor teeth 46 are north poles and the uppermost poles are south poles.

The stator 50 of this second embodiment of the invention includes an annular field winding 51 which is embraced by annular pole shoes 52 and 53. These pole shoes are of similar material to the shoes 26 and 27 of the first embodiment, but their teeth 54 and 55, while extending away from the field winding 51 and being parallel to each other, are spaced apart axially of the motor. The stator teeth 54 and 55 are of similar construction to the corresponding stator teeth 28 and 29 of the first embodiment and will not be further described. The rotor 40 of this second embodiment of the invention rotates with respect to the stator upon a central shaft or axle 57 in bearings 58 and 59 which are mounted in housing parts 60 and 61, respectively.

It will be evident that the embodiment of FIGS. 9–11 operates in identical fashion to that of FIGS. 1–8, the only real difference between the two embodiments being that in the first case the stator pole piece teeth are spaced apart radially and the rotor teeth extend axially therebetween, while in the second case the stator pole piece teeth are spaced apart axially and the rotor teeth extend radially therebetween. In both cases the rotor teeth are directly between the opposite polarity stator teeth, so that the shortest distance for magnetic flux between the stator teeth is through the rotor teeth. Thus, no substantial amount of magnetic power is wasted and the efficiency of the motor is extremely high.

Figure 12:
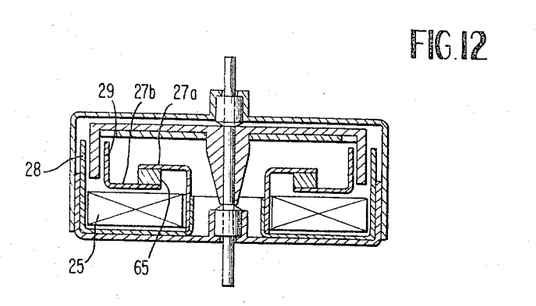
FIG. 12 is a cross sectional view of a pulse motor generally similar to the embodiment of FIG. 1.

Referring now to FIG. 12, the embodiment therein shown is identical to that of FIG. 1, except that the stator pole shoe 27 is divided into two parts 27a and 27b, spaced apart axially so as to provide mounting room for an annular permanent magnet 65. This magnet is magnetized in an axial direction so as to provide that the teeth 28 and 29 are of opposite polarity even when no power is supplied to the field winding 25. The magnetic strength of the magnet 65 and the voltage supplied to the field winding 25 are such that, when current is supplied to the field winding, the magnetomotive force which is generated thereby is higher than that supplied by the magnet 65. (Actually it is preferred that the magnetomotive force developed by current through the field coil be about three times that supplied by the permanent magnet.) Therefore, when a pulse source in which all pulses are of one polarity, is connected to the field winding 25 (and the pulses are of polarity such as to tend to polarize the pole teeth 28 and 29 oppositely to the polarization caused by the permanent magnet 65), the rotor will advance one step with each pulse and will then remain locked in position by the magnetic force established by the permanent magnet 65.

Consequently, the motor of FIG. 12 is a pulse motor which of course may be used for the same purposes as the self-synchronous type of motor.

Figure 13:
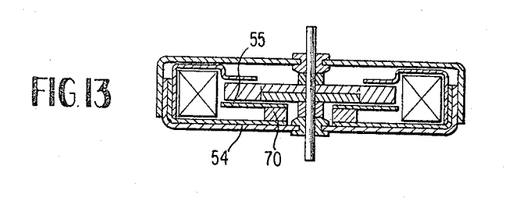
FIG. 13 is a cross sectional view of a pulse embodiment generally similar to the embodiment of FIG. 9.

Referring now to FIG. 13 the only difference between the apparatus of that figure and the construction of the motor shown in FIGS. 9–11 is that the pole piece 53 is in two portions 54 and 55 which are axially displaced to provide mounting room for a permanent magnet 70. This permanent magnet, similarly to magnet 65 of FIG. 12, is magnetized axially and functions to provide a "bias" magnetization. The motor of FIG. 13 operates in similar fashion to the motor of FIG. 12, as a pulse motor, with the rotor being advanced one step each time a pulse of voltage is supplied to the field winding, and being held locked in position by the bias magnetization provided by the permanent magnet 70.

Figure 14:
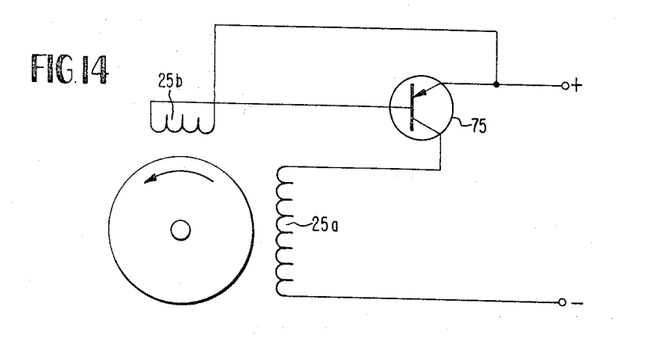
FIG. 14 is a schematic view of a system for operating the synchronous motor of the invention from a direct current source.

It was indicated in conjunction with the description of the apparatus of FIGS. 1–11 that the field winding should be supplied with alternating current voltage. The apparatus of FIG. 14 is designed to provide an appropriate alternating current drive for the motor, from a direct current source. In that apparatus the field winding is separated into two parts, 25a and 25b, the portion 25b being designed to provide a smaller number of ampere turns, since it is designed to operate as a feedback winding. The two portions of course may be adjacent each other on the same form (not shown). The windings 25a and 25b are connected to the power transistor 75 whose emitter is designed to be connected to the positive terminal of an appropriate direct current source (not shown). The collector of transistor 75 is connected through the winding 25a to the negative terminal of the source. The base of the transistor is connected through the winding 25b to the emitter of the transistor, so that the entire apparatus functions as a blocking oscillator which will supply appropriate pulses of current to cause the rotor to periodically advance with respect to the stator.

It will be evident that other kinds of discharge devices than transistors could be employed in the apparatus of FIG. 14. More particularly, there are now such devices as controlled rectifiers, multi-junction diodes, and the like which could be substituted (with appropriate design changes of the type readily apparent to the skilled engineer) for the transistor 75 in FIG. 14.

Figure 15:
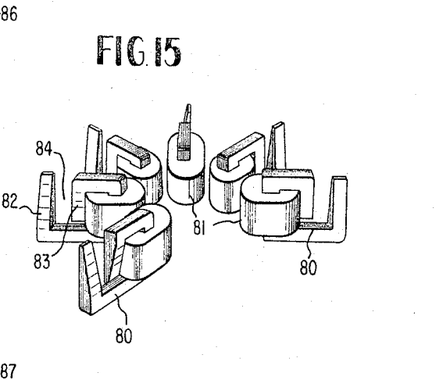
FIG. 15 is a perspective view of another form of the apparatus of the invention, wherein a plurality of stator coils are employed, each having a separate magnetic circuit.

Referring now to FIG. 15, it is not at all essential that a single annular field coil and a single stator core be employed. As a matter of fact, if a single coil and core are used, as in the preceding embodiments of the invention, the self inductance of the stator system will increase with frequency, so that, if the speed of the rotor is to be increased by an increase in frequency of the applied voltage, the voltage will have to be increased in magnitude in order to compensate for the increase in self inductance voltage drop as frequency rises. To compensate for this effect and to reduce to the absolute minimum the increase in self inductance with increased frequency of applied voltage, the same number of ampere turns may be obtained through use of a plurality of coils each of small number of turns, and each supplied with a relative large current. The apparatus of FIG. 15 shows a plurality of cores and coils for this purpose, the cores being identified by the numeral 80, and the coils by the numeral 81.

The showing of FIG. 15 is of course diagrammatic in nature and does not include the corresponding rotor. However, it will be evident that each core is formed of a plurality of laminations, each of which is of generally G-shape, the laminations being appropriately fixed together. The coils are shown as embracing the lower legs of the G-shape core (considering the G-shape as arranged in normal letter relationship). The stator teeth for each core are defined by the upper legs 82 and 83 of the core, and the air gap within the rotor poles extend is between these two legs or teeth 82 and 83.

It will of course be evident that the coils could be outward of the air gaps 84, rather than inward thereof, as shown in FIG. 15. That is, the cores could be, in effect reversed, such that the air gaps extended radially inwardly, instead of outwardly.

The teeth defined by the legs 82 and 83 are shown in FIG. 15 as of generally triangular cross section, similarly to the teeth of the other embodiments previously described. However, in the embodiment of FIG. 15 it will be noted that, though the teeth are each generally of right-triangular configuration and are opposed to each other with the axially-extending legs in a common plane containing the axis of the motor, the hypotenuse of each opposite tooth extends in a different direction and the hypotenuses are not parallel as in the previously-described embodiments. Nevertheless, in the embodiment of FIG. 15, as in embodiments previously described, each stator tooth is of decreasing cross sectional area progressing from the rear surface to the front surface of the tooth, in the direction of rotation of the rotor. This is the mechanical configuration by which the self-starting characteristics of the motor are obtained, in a single phase embodiment thereof. That is, the rotor poles are urged in the direction in which the stator teeth cross section decreases in area, by reason of the relationships described in conjunction with FIGS. 4-8 of the application.

Figure 16:
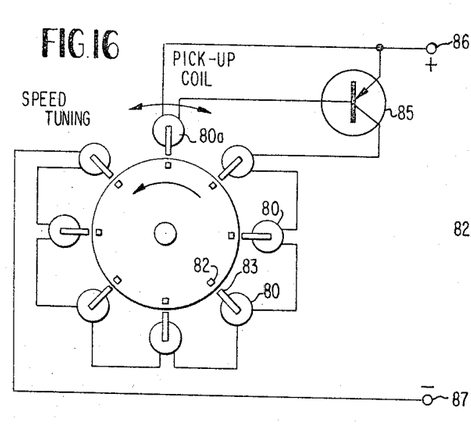
FIG. 16 is a schematic showing of one connection arrangement possible with the magnetic arrangement of FIG. 15.

FIG. 16 shows one embodiment of the separate core configuration of the invention, arranged for single phase operation, and operative with the direct current source. In that figure all of the coils except the coil 80A are connected in series with a switch formed by transistor 85. The rotor however is shown only as a circle, for simplicity's sake, and the poles thereof are not indicated. The transistor 85 is of the PNP type, as indicated, and its emitter-collector circuit is connected in series with the coils 80 across a source not shown but indicated by the terminals 86 and 87.

The switch-like operation of the transistor is obtained by a control circuit including the coil 80A which is connected between the emitter and base of the transistor.

The pickup or feedback coil 80A operates to develop a voltage which of course is dependent upon the speed of rotation of the rotor. When the circuit is first completed as by closure of a switch connected between the direct-current voltage source and the transistor 85, current begins to flow through transistor 85 and the series-connected coils 80. The motor therefore begins to turn in accordance with the operation described above. A voltage is thereupon developed by coil 80A which turns off the transistor. When the transistor switch is turned off, the rotor will of course coast into a position such that the transistor is then biased on, whereupon current again flows through the coils 80 and then tends to turn the motor again. The series of pulses through the coils 80 provided by this mechanism act as a number of spaced "pushes" on the rotor to keep it turning at a speed determined by the mechanics of the system and the saturation characteristics of the pickup coil.

Figure 17:
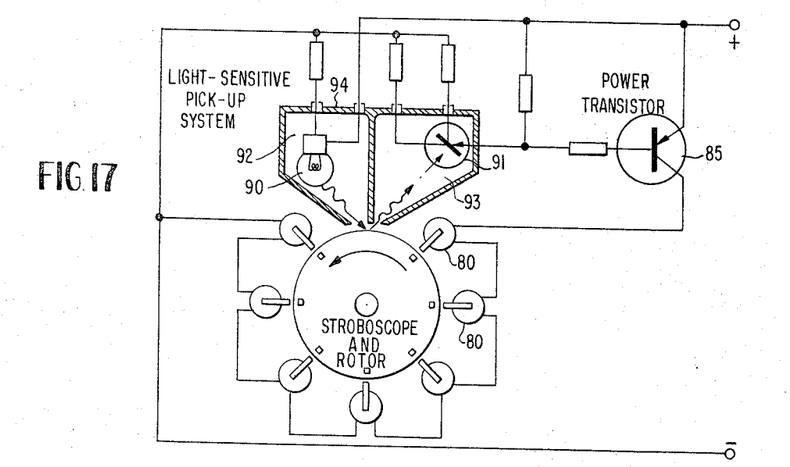
FIG. 17 is a schematic showing of a modification of the apparatus of FIG. 16.

FIG. 17 shows another type of switch-controlled direct current motor. In this case no feedback coil is employed but rather the speed responsive system is operated by light flashes. The motor rotor may in such case have the usual stroboscopic disc mounted thereon with alternate black and white stroboscopic elements, or with alternate reflective and dull segments. Light from an incandescent source 90 may be directed on such stroboscopic ring and reflected therefrom to a light sensitive member such as a photo-transistor 91. The incandescent source 90 and the photo-transistor 91 may be mounted in separate compartments 92 and 93, respectively, of a light sealed housing 94 which has openings at the lower ends of the compartments 92 and 93, so that light from the source 90 may be reflected to the photo-transistor 91 to cause conduction thereof when a reflective element is opposite the opening in the housing. The photoconductor may then be connected in an appropriate control circuit for the power transistor 85 in such arrangement that the transistor is alternately turned off and on as the reflective and dull segments of the stroboscope pass the light system. Consequently, the transistor 85 is pulsed at the speed of rotation of the rotor.

Figure 18:
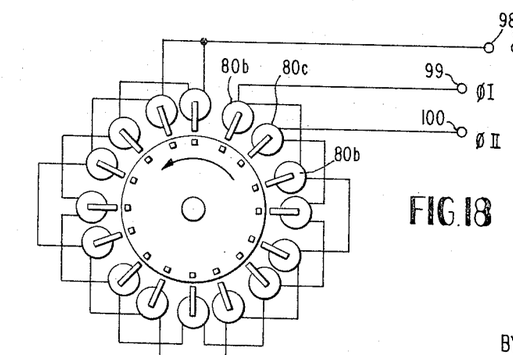
FIG. 18 is a schematic showing of a two phase connection arrangement with a magnetic arrangement similar to FIG. 15.

The systems so far described in this application are all of single phase design. One substantial advantage of the plural core arrangement of FIG. 15 is that a plural phase design is possible therewith. FIG. 18 shows such an arrangement in which alternate coils 80B are connected in series between a common terminal 98 and a terminal 99 while the remaining coils 80C are connected in series between terminal 98 and a terminal 100. A voltage of one phase is applied between terminals 98 and 99 and a voltage of a second phase, 90° displaced from the first phase, is applied to terminals 98 and 100.

Figure 19:
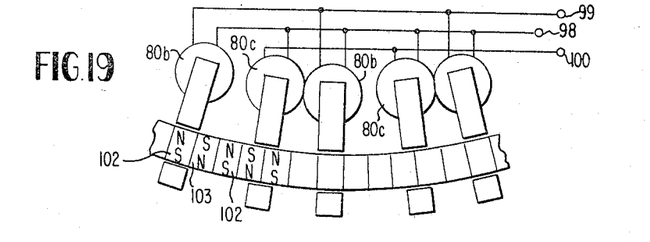
FIG. 19 is a diagrammatic showing of one physical arrangement possible with the connection arrangement of FIG. 18.
Figure 20:
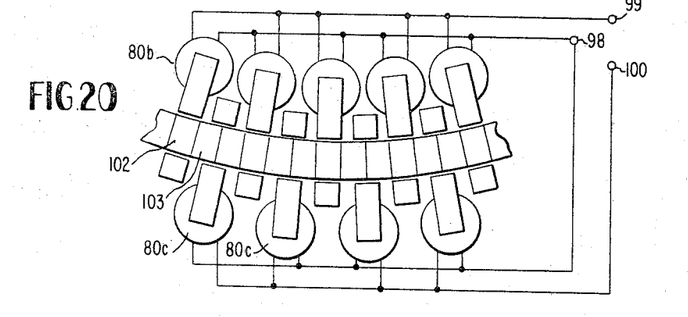
FIG. 20 is a diagrammatic showing of another physical arrangement for two phase operation; and, FIG. 21 is a diagrammatic showing useful in explaining the operation of the two phase system of the invention.

FIGS. 19 and 20 show two different types of arrangements of the kind shown in FIG. 18. In FIG. 19 the rotor core 101 is shown as including alternate polarity poles 102 and 103, with successive coils 80B of one phase spaced apart by five rotor pole spaces. The same is true with respect to the successive coils 80C, but it will be noted that the coils 80C are not equally spaced from the two adjacent coils 80B. The reason for this arrangement is that the spacing between adjacent coils of different phases must be an odd numbered multiple of the distance occupied by one pole of the rotor.

The biphase arrangement of FIG. 20 is shown as having twice the number of cores and coils as the arrangement of FIG. 19. The adjacent coils are at opposite sides of the rotor, and, since adjacent coils of the same phase are spaced apart by an odd-numbered multiple of the distance occupied by one rotor pole, the spacings between a coil of one phase and the adjacent coils of the other phase can be the same.

With the apparatus of FIGS. 18-20 using a biphase system, self-starting operation is obtained without the necessity for the use of the triangular-shaped core teeth shown in FIG. 15. Rather, the teeth of the individual cores may be of rectangular shape yet the self-starting arrangement will still be obtained by a mechanism, described in conjunction with FIG. 21.

Figure 21A:
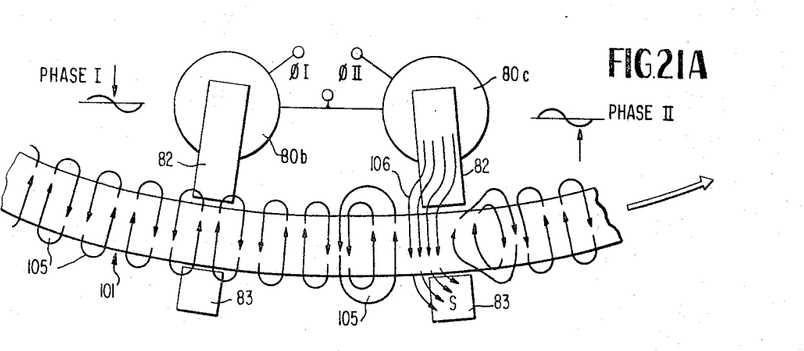

Referring first to FIG. 21A, the flux loops due to each individual pole of the rotor 101 are shown at 105. As indicated by the figure, it is assumed that the instantaneous phase position is such that the voltage applied to coil 80B is zero, so that there is no externally applied magnetomotive force developed between the core teeth 82 and 83 associated with coil 80B. However, since the second phase (II) is 90° ahead of the first phase, the voltage applied to coil 80C at this time is maximum. Consequently, an externally-applied magnetomotive force of the polarity indicated is developed between the teeth 82 and 83 of the core associated with coil 80C. This magnetomotive force causes magnetic flux lines to flow between the teeth 82 and 83, but the relationship with the flux paths 105 is such that the paths 106 between the core teeth are distorted in a direction to the left of FIG. 21A. It is an axiom of electromagnetics that a magnetic system tries to align itself such that flux lines will have the shortest possible paths. For this reason, the rotor 101 moves to the right of FIG. 21A to shorten the flux lines 106.

Figure 21B:
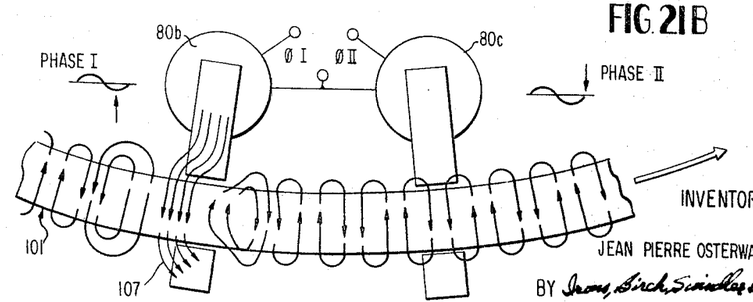

At the next instant of time to be examined it is assumed that the voltage applied to coil 80B is at a maximum, while that applied to coil 80C is zero. That is, the applied voltage phases have gone through a 90° change over the condition shown in FIG. 21A. This condition is shown in FIG. 21B and it is seen therein that the flux lines 107 due to the magnetomotive force applied by current through the coil 80B are distorted in the same direction as the flux lines 106 in FIG. 21A were distorted. For the same reason the rotor is given another push to the right under the condition of FIG. 21B.

It will be evident that these steps indicated by FIG. 21A and FIG. 21B will be repeated time after time, so that the rotor 101 is driven in the counterclockwise direction under the circumstances indicated by those figures.

With the plurality of stator core and coil arrangements indicated by FIG. 15 it is possible to obtain the maximum possible ampere turns with the smallest possible self inductance. For this purpose a few turns may be employed in each coil, with the wire large enough in diameter to carry a relatively large current, and with such coil wrapped around as few as one or two laminations of soft magnetic material having a very high saturation value.

The rotor may be, for instance, an anodized aluminum wheel, and indeed a single rotor wheel, rather than the two element wheels shown in the drawings, may be employed.

With the apparatus of the invention it is possible to construct a motor having a rotor as small as 1.2 inches in diameter with as many as 90 to 180 poles. This large number of poles makes it possible to obtain an extremely low speed, eliminating the need for gear reduction which of course presents accompanying backlash and mechanical complications.

It will also be evident that a three phase synchronous motor could be constructed by dividing the total number of stator core-coil combinations by three and connecting each of the three sets thus obtained to different 120° phase displaced voltage sources.

It will be evident that many other changes than those indicated could be made in the apparatus of the invention without departure from the scope thereof. For instance, the rotor need not be of the two part construction described herein but may be of one part. In fact, spaced rotor teeth are not necessary with such a construction. However, since it is much easier to magnetize discrete, oppositely polarized, magnets with the two part configuration, (particularly when a large number of poles is necessary), that construction is preferred.

It is also not essential that the stator teeth be defined by rectilinear surfaces, since curvilinear surfaces corresponding to the hypotenuses shown in the drawings might operate as well or better.

It is also not essential that all the stator teeth of one set be equally spaced apart around the stator. In fact, any multiple of two stator teeth (the opposite ones of the inner and outer set) could be removed from the construction shown in the drawings so long as at least two stator teeth remained.

The invention is not to be considered limited to the particular embodiments shown in the drawings and described in the specification, but rather only by the scope of the appended claims.

I claim:

1. A self-starting synchronous motor comprising
a stator including an annular field coil operable when electrical current is flowing therethrough to provide closed magnetic flux paths which describe a toroid around the field coil, and annular ferromagnetic pole piece means generally conforming to the shape of said toroid and substantially enveloping said coil but having two opposite parallel sets of peripherally spaced teeth extending outward from the coil in such fashion as to define an annular air gap coaxial with the coil, so that current flowing in one direction in the field coil causes the teeth of one set to be of north polarity and the teeth of the other set to be of south polarity, while current flowing in the opposite direction in the coil will cause the teeth of said one set to be of south polarity and the teeth of said other set to be of north polarity,
and a permanently magnetized rotor mounted for rotation about the axis of said field coil and having a plurality of discrete poles around its periphery, adjacent poles being of opposite polarity, said rotor projecting into said annular air gap defined by said opposite sets of spaced stator teeth in such fashion that straight lines across said gap between the north and south stator teeth pass through the rotor poles, said stator teeth being each of generally right triangular configuration with the hypotenuse of each tooth extending from an apex most remote of the field coil toward the main body of the pole piece means, said teeth being each of decreasing cross sectional area progressing from the rear surface to the front surface of the tooth, in the direction of rotation of the rotor.

2. The apparatus of claim 1 including means for conducting alternating current through said field coil.

3. The apparatus of claim 1 including a second annular field coil mounted with the first-mentioned coil inward of said pole piece means,
and a controllable electron discharge device having control electrodes connected in series with said second coil and output electrodes connected in series with said first-mentioned coil,
the combination of said two field coils and said discharge device being operable when connected to a source of direct current to develop an alternating-like current through the first-mentioned coil.

4. The apparatus of claim 3 in which said discharge device is a transistor, and including a pair of terminals to which said source of direct current may be connected,
one of said coils being connected between the base of the transistor and one of said terminals, the other of said coils being connected between the collector of said transistor and the other terminal, and the emitter of the transistor being connected to said one terminal, said transistor being mounted on said motor.

5. A self-starting synchronous motor comprising
a stator including an annular field coil operable when electrical current is flowing therethrough to provide closed magnetic flux paths which describe a toroid around the field coil, and annular ferromagnetic pole piece means generally conforming to the shape of said toroid and substantially enveloping said coil but having two opposite parallel sets of peripherally spaced teeth extending outward from the coil in such fashion as to define an annular air gap coaxial with the coil, so that current flowing in one direction in the field coil causes the teeth of one set to be of north polarity and the teeth of the other set to be of south polarity, while current flowing in the opposite direction in the coil will cause the teeth of said one set to be of south polarity and the teeth of said other set to be of north polarity,
and a permanently magnetized rotor mounted for rotation about the axis of said field coil and having a plurality of discrete poles around its periphery, adjacent poles being of opposite polarity, said rotor projecting into said annular air gap defined by said opposite sets of spaced stator teeth in such fashion that straight lines across said gap between the north and south stator teeth pass through the rotor poles, said stator teeth being each of generally right triangular configuration with the apex portion of each tooth removed to form a trapezoidal shape, and with the hypotenuse of each tooth extending from an apex most remote of the field coil toward the main body of the pole piece means, said teeth being each of decreasing cross sectional area progressing from the rear surface to the front surface of the tooth, in the direction of rotation of the rotor,
the numbers of stator teeth and rotor poles being such that when two rotor poles are respectively opposite adjacent stator teeth of one set there is an odd number of rotor poles between said two rotor poles.

6. The apparatus of claim 5 wherein the rotor poles extend axially into said annular air gap from a central disc portion.

7. The apparatus of claim 6 in which said rotor is composed of two separately magnetized parts, each formed by a central disc portion and a plurality of axially extending teeth spaced apart circumferentially of the part, the teeth of each part being radially magnetized with the teeth of one part having north poles outward and the teeth of the other part having south poles outward, the two parts being so constructed and mounted together that the teeth of one part extend between the teeth of the other part.

8. The apparatus of claim 5 wherein the rotor poles extend radially into said annular air gap from a central disc portion.

9. The apparatus of claim 8 in which said rotor is composed of two separately magnetized parts, each formed by a central disc portion and a plurality of radially extending teeth spaced apart circumferentially of the part, the teeth of each part being axially magnetized with the direction of magnetization opposite in the two parts, the two parts being so constructed and mounted together that the teeth of one part extend between the teeth of the other part.

10. The apparatus of claim 5 in which said stator further includes an annular permanent magnet so associated with said pole piece means as to bias the stator teeth of one set as north poles and the teeth of the other set as south poles,
and means for delivering to said field coil pulses of electric current of polarity and amplitude such as to overcome said bias and make the teeth of said one set south poles and the teeth of said other set north poles.

11. A self-starting synchronous motor comprising
a stator including ferromagnetic pole piece means having two opposite parallel sets of peripherally spaced teeth arranged such as to define an annular air gap, and means for establishing magnetic fields having flux paths extending between said opposite teeth, said fields being such that each tooth is cyclically alternately of different polarities, with opposed teeth of opposite polarities,
and a permanently magnetized rotor mounted for rotation about the axis of said annular air gap and having a plurality of discrete poles around its periphery, adjacent poles being of opposite polarity, said rotor projecting into said annular air gap in such fashion that straight lines across said gap between the opposite stator teeth pass through the rotor poles from one polarity to the other thereof,
said stator teeth being so constructed and arranged in conjunction with said means for establishing magnetic fields that the rotor is continuously urged in the same direction by magnetic forces between the rotor poles and the stator teeth.

12. The apparatus of claim 11 in which said stator teeth are each of generally right-triangular configuration, said teeth being each of decreasing cross-sectional area progressing from the rear surface to the front surface of the tooth, in the direction of rotation of the rotor.

13. The apparatus of claim 11 in which
said ferromagnetic pole piece means include a plurality of separate arcuately-spaced ferromagnetic cores, each of which includes an opposed pair of said teeth, and said magnetic field-establishing means comprises a corresponding plurality of electrical coils, a different one of said coils linking each of said ferromagnetic cores, and means for passing electrical currents through said coils.

14. The apparatus of claim 13 in which there are two sets of alternately-disposed ones of said coil-core combinations, progressing around said stator, each set including a plurality of core-coil combinations,
and said current passing means includes first means for supplying the coils of one set with current of one phase and second means for supplying the coils of the other set with current of phase substantially 90° different from that of said one phase.

15. The apparatus of claim 14 in which each of said first and said second means supplies alternating current to the coils of its associated set.

16. The apparatus of claim 15 in which the coils of each set are connected in series with each other.

17. The apparatus of claim 15 in which the coils of each set are connected in parallel with each other.

18. The apparatus of claim 15 in which the cores of each set are equally spaced apart progressively around the stator by the distance occupied by an integral number of rotor poles, and the adjacent cores of different sets are spaced apart by substantially an odd-numbered multiple of one-half the arcuate dimension of one rotor pole.

19. The apparatus of claim 18 in which each core is composed of a plurality of laminations each of substantially G-shape, with the associated coil wound around the lower part of the G, and the teeth defined by the two upper parallel spaced legs of the G.

20. The apparatus of claim 13 in which each core is composed of a plurality of laminations each of substantially G-shape, with the associated coil wound around the lower part of the G, and the teeth defined by the upper two parallel spaced legs of the G.

21. The apparatus of claim 20 in which said current-passing means is a source of alternating current voltage connected across the series connection of said coils.

22. The apparatus of claim 21 in which said stator teeth are each of generally right-triangular configuration, said teeth being each of decreasing cross sectional area progressing from the rear surface to the front surface of the tooth, in the direction of rotation of the rotor.

23. The apparatus of claim 11 in which said stator further includes permanent magnet means magnetically linked with said pole piece means in such fashion as to bias the teeth of one set as north poles and the teeth of the other set as south poles,
said magnetic field-establishing means including coil means magnetically linked with said pole piece means, and means for delivering to said coil means pulses of electric current of polarity and amplitude such as to overcome said bias and make the teeth of one set south poles and the teeth of said other set north poles.

24. The apparatus of claim 13 in which said passing means includes a blocking oscillator having one of said coils connected as a feedback coil therein and the other coils connected in series as the output circuit thereof.

25. The apparatus of claim 24 in which said blocking oscillator includes a discharge device having a control circuit and said output circuit, said feedback coil being connected in said control circuit, and a source of direct-current voltage connected in series with said other coils in said output circuit.

26. The apparatus of claim 25 in which the position of the core associated with said one coil is adjustable arcuately to adjust the rotor speed.

27. The apparatus of claim 13 in which said stator teeth are each of generally right-triangular configuration, said teeth being each of decreasing cross sectional area progressing from the rear surface to the front surface of the tooth, in the direction of rotation of the rotor.

28. The apparatus of claim 27 including a source of direct-current voltage and switch means connected in series with at least several of said coils across said source to form a circuit, said switch means being operable alternately to complete and to interrupt said circuit so that pulses of current flow in said coils.

29. The apparatus of claim 28 in which said switch has a control circuit operable when a voltage is applied thereto to open said switch, said control circuit including one of said coils not connected in said circuit across said source.

30. The apparatus of claim 29 in which said switch is a transistor, said one coil being connected between emitter and base of said transistor and said several coils being connected in series with the emitter-collector circuit of said transistor across said source.

31. The apparatus of claim 30 in which said one coil and its associated core are arcuately adjustable in position with respect to the other cores to vary the speed of said motor.

32. The apparatus of claim 28 in which said switch has a control circuit operable when a voltage is applied thereto to open said switch, and means for applying spaced pulses of voltage to said control circuit at a frequency dependent on the speed of rotation of said rotor.

33. The apparatus of claim 32 in which said pulse-applying means includes a light-sensitive speed detecting system including a stroboscope member rotating with said rotor.

References Cited
UNITED STATES PATENTS
3,032,670   5/1962   Fritz _______________ 310—164

MILTON O. HIRSHFIELD, *Primary Examiner.*
L. L. SMITH, *Assistant Examiner.*